United States Patent
Park et al.

(10) Patent No.: US 11,964,636 B2
(45) Date of Patent: Apr. 23, 2024

(54) METHOD OF CONTROLLING AN AIR BLOWING APPARATUS

(71) Applicants: HYUNDAI MOTOR COMPANY, Seoul (KR); KIA CORPORATION, Seoul (KR)

(72) Inventors: Jong Min Park, Seoul (KR); Seung Sik Han, Hwaseong-si (KR); Ki Hong Lee, Seoul (KR); Nak Kyoung Kong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/215,658

(22) Filed: Jun. 28, 2023

(65) Prior Publication Data
US 2023/0339435 A1    Oct. 26, 2023

Related U.S. Application Data

(63) Continuation of application No. 16/940,997, filed on Jul. 28, 2020, now abandoned.

(30) Foreign Application Priority Data

Jan. 16, 2020 (KR) .................. 10-2020-0005713

(51) Int. Cl.
*B60S 1/54* (2006.01)
*B08B 5/02* (2006.01)
*G01W 1/14* (2006.01)

(52) U.S. Cl.
CPC .................. *B60S 1/54* (2013.01); *B08B 5/02* (2013.01); *B60S 1/548* (2013.01); *G01W 1/14* (2013.01)

(58) Field of Classification Search
CPC ..... B08B 5/02; B08B 3/02; B60S 1/54; B60S 1/52; B60S 1/548; G01W 1/14
See application file for complete search history.

(56) References Cited

U.S. PATENT DOCUMENTS

5,486,139 A    1/1996 Papp
6,290,361 B1    9/2001 Berzin
(Continued)

FOREIGN PATENT DOCUMENTS

| CN | 106427899 A | * | 2/2017 | |
| CN | 109387887 A | * | 2/2019 | .............. G01W 1/14 |

(Continued)

OTHER PUBLICATIONS

Nishiyama, JP-2010188822-A, Machine Translation. (Year: 2024).*
(Continued)

*Primary Examiner* — Duy Vu N Deo
*Assistant Examiner* — Christopher Remavege
(74) *Attorney, Agent, or Firm* — Lempia Summerfield Katz LLC (57) ABSTRACT

A method of controlling an air blowing apparatus includes: determining whether there is precipitation through a rain sensor by a controller; determining whether the air blowing apparatus is in an automatic mode in a precipitation condition by the controller; determining a vehicle speed when the air blowing apparatus is in the automatic mode in the precipitation condition; and setting power and a spray angle of the air blowing apparatus by comparing a rainfall received from the rain sensor to a stored rainfall by the controller. Setting the power and the spray angle of the air blowing apparatus includes compensating the spray angle and a spray amount by measuring a flow speed and a flow angle of rainwater through the rain sensor by the controller.

20 Claims, 10 Drawing Sheets

(56) References Cited

U.S. PATENT DOCUMENTS

| | | | |
|---|---|---|---|
| 7,040,328 B2 | 5/2006 | Woodard | |
| 7,268,691 B2 * | 9/2007 | Koors | G01W 1/14 |
| | | | 702/3 |
| 7,972,203 B2 * | 7/2011 | Raghuprasad | B60S 1/54 |
| | | | 416/223 R |
| 8,322,776 B2 * | 12/2012 | Fioravanti | B60J 1/2005 |
| | | | 296/96.15 |
| 9,783,166 B1 | 10/2017 | Brown et al. | |
| 10,688,971 B2 | 6/2020 | Nielsen | |
| 2013/0145839 A1 * | 6/2013 | Niemann | G01N 29/2437 |
| | | | 73/170.17 |
| 2014/0117701 A1 | 5/2014 | Davis et al. | |
| 2015/0178902 A1 * | 6/2015 | Lee | G06T 5/77 |
| | | | 382/104 |
| 2015/0367819 A1 | 12/2015 | Bazaz | |
| 2017/0227632 A1 * | 8/2017 | Takayama | G01S 13/34 |
| 2017/0259788 A1 | 9/2017 | Villa-Real | |
| 2019/0337489 A1 * | 11/2019 | Baldovino | G01N 21/15 |
| 2021/0339711 A1 | 11/2021 | Menicovich et al. | |
| 2021/0362688 A1 * | 11/2021 | Kawamura | B60S 1/526 |

FOREIGN PATENT DOCUMENTS

| | | | |
|---|---|---|---|
| DE | 202017005995 U1 | 12/2017 | |
| DE | 102017010723 A1 * | 5/2019 | B60S 1/544 |
| FR | 3080816 A1 | 11/2019 | |
| JP | 2010188822 A * | 9/2010 | |
| KR | 20020047706 A | 6/2002 | |
| KR | 20040015456 A | 2/2004 | |
| KR | 20180071581 A | 6/2018 | |
| KR | 20180131691 A | 12/2018 | |

OTHER PUBLICATIONS

Kilic, DE 202017005995 U1, Machine Translation dated Jun. 12, 2022 (Year: 2022).*

CN-106427899-A, Machine Translation. (Year: 2024).*

CN-109387887-A, Machine Translation. (Year: 2024).*

* cited by examiner

METHOD OF CONTROLLING AN AIR BLOWING APPARATUS

CROSS REFERENCE TO RELATED APPLICATION

The present application is a continuation of U.S. application Ser. No. 16/940,997 filed Jul. 28, 2020 and which claims priority to Korean Patent Application No. 10-2020-0005713 filed Jan. 16, 2020. The entire contents of these prior filed applications are incorporated herein for all purposes by this reference.

BACKGROUND

Field of the Disclosure

The present disclosure relates to a method of controlling an air blowing apparatus and, more particularly, a method of controlling a discharge amount and a spray angle of an air blowing apparatus in accordance with a rainfall condition and a speed condition of a vehicle.

Description of the Related Art

In general, a vehicle is equipped with a wiper system for the windshield glass.

In the related art, a wiper system that can move on the surface of the glass is used to secure a visual field through the glass when it rains.

Further, washer fluid is sprayed through nozzles and wiper arms are operated by the wiper system. In this way, the glass is washed and the visual field for the driver is secured.

However, according to the wiper system of the related art, the wiper arms reciprocate on the glass, so there is a defect that the wipers interfere with the visual field of the driver. Further, there is a problem that the wipers have to be frequently replaced as a consumable.

Recently, the function and the size of the engines used in the related art are decreased with development of hybrid or plug-in hybrid vehicles that can be electrically driven. This results in additional spatial room in the front part of the vehicles.

Accordingly, it is required to develop a technology for securing a visual field through the windshield glass when it rains by discharging compressed air using an air fan in the front part of a vehicle.

SUMMARY

The present disclosure has been made in an effort to solve the problems of the related art. An objective of the present disclosure is to provide a method of controlling an air blowing apparatus for securing a visual field through a windshield glass by discharging compressed air.

Another objective of the present disclosure is to provide a method of controlling an air blowing apparatus, the method being able to control the pressure and the left-right angle of discharged air in correspondence to the surrounding environment of a vehicle.

The objectives of the present disclosure are not limited to those described above and other objectives not stated herein may be understood through the following description and may be clear by embodiments of the present disclosure. Further, the objectives of the present disclosure are achieved by the configurations described in the claims and combinations thereof.

A method of controlling an air blowing apparatus for achieving the objects of the present disclosure includes the following configuration.

A method of controlling an air blowing apparatus according to an embodiment of the present disclosure includes: determining whether there is precipitation through a rain sensor by a controller; determining whether the air blowing apparatus is in an automatic mode in a precipitation condition by the controller; determining a vehicle speed when the air blowing apparatus is in the automatic mode in the precipitation condition; and setting power and a spray angle of the air blowing apparatus by comparing a measured rainfall received from the rain sensor to a stored rainfall by the controller. Setting the power and the spray angle of the air blowing apparatus includes compensating the spray angle and a spray amount of the air blowing apparatus by measuring a flow speed and a flow angle of rainwater through the rain sensor by the controller The method may further include, in the determining of a vehicle speed: comparing a vehicle speed received from the controller with a first vehicle speed; determining a stop condition of the vehicle when the vehicle speed is the first vehicle speed or less, and comparing the vehicle speed with a second vehicle speed when the vehicle speed exceeds the first vehicle speed; determining a low-speed state of the vehicle when the vehicle speed is the second vehicle speed or less, and comparing the vehicle speed with a third vehicle speed when the vehicle speed exceeds the second vehicle speed; and determining that the vehicle is in a medium-speed state when the vehicle speed is the third vehicle speed or less, and determining that the vehicle is in a high-speed state when the vehicle speed exceeds the third vehicle speed.

When the state of the vehicle is determined in the determining of a vehicle speed, the controller may compare a measured rainfall received from the rain sensor to a stored rainfall. The method may further include: comparing the measured rainfall with a first rainfall stored in the controller; determining a weak precipitation condition when the measured rainfall is the first rainfall or less, and comparing the measured rainfall with a second rainfall stored in the controller when the measured rainfall exceeds the first rainfall; and determining a medium precipitation condition when the measured rainfall is the second rainfall or less, and determining a heavy rain condition when the measured rainfall exceeds the second rainfall.

The method may further include controlling the air blowing apparatus to have a first spray angle and a first discharge amount when the measured rainfall is the first rainfall or less in a stop condition of the vehicle.

The method may further include controlling the air blowing apparatus to have a first spray angle and a second discharge amount when the measured rainfall exceeds the first rainfall and is the second rainfall or less in a stop condition of the vehicle.

The method may further include controlling the air blowing apparatus to have a first spray angle and a third discharge amount when the measured rainfall exceeds the second rainfall in a stop condition of the vehicle.

The method may further include controlling the air blowing apparatus to have a third spray angle and a second discharge amount when the measured rainfall is the first rainfall or less in a low-speed condition of the vehicle.

The method may further include controlling the air blowing apparatus to have a third spray angle and a third discharge amount when the measured rainfall exceeds the first rainfall and is the second rainfall or less in a low-speed condition of the vehicle.

The method may further include controlling the air blowing apparatus to have a first spray angle and a third discharge amount when the measured rainfall exceeds the second rainfall in a low-speed condition of the vehicle.

The method may further include controlling the air blowing apparatus to have a second spray angle and a first discharge amount when the measured rainfall is the first rainfall or less in a medium-speed condition of the vehicle.

The method may further include controlling the air blowing apparatus to have a second spray angle and a second discharge amount when the measured rainfall exceeds the first rainfall and is the second rainfall or less in a medium-speed condition of the vehicle.

The method may further include controlling the air blowing apparatus to have a first spray angle and a third discharge amount when the measured rainfall exceeds the second rainfall in a medium-speed condition of the vehicle.

The method may further include controlling the air blowing apparatus to have a first spray angle and a first discharge amount when the measured rainfall is the first rainfall or less in a high-speed condition of the vehicle.

The method may further include controlling the air blowing apparatus to have a first spray angle and a third discharge amount when the measured rainfall exceeds the first rainfall and is the second rainfall or less in a high-speed condition of the vehicle.

The method may further include controlling the air blowing apparatus to have a first spray angle and a third discharge amount when the measured rainfall exceeds the second rainfall in a high-speed condition of the vehicle.

The method may further include, in setting the power and the spray angle of the air blowing apparatus: measuring the flow speed and the flow angle of rainwater on a windshield glass through the rain sensor; and controlling the power of the air blowing apparatus in accordance with the measured flow speed and flow angle of the rainwater.

The method may further include: measuring whether the flow speed of the rainwater measured by the rain sensor is a first reference value or more and measuring whether the flow angle is less than a second reference value by the controller; determining whether a discharge amount of the air blowing apparatus is a maximum amount by the controller when the flow speed of the rainwater is the first reference value or more and the flow angle of the rainwater is less than the second reference value; determining whether the flow angle of the rainwater exceeds the second reference value by the controller when the discharge amount of the air blowing apparatus is the maximum amount; determining whether a spray angle of the rainwater is a minimum angle by the controller when the discharge amount of the air blowing apparatus is the maximum amount and the flow angle of the rainwater is the second reference value or less; and providing notification to a user by the controller when the spray angle of the rainwater is the minimum angle.

The method may further include: determining whether the flow speed of the rainwater measured by the rain sensor is less than a first reference value and whether the flow angle of the rainwater is a second reference value or more by the controller; setting a discharge amount of the air blowing apparatus to a maximum by the controller when the flow speed of the rainwater is less than the first reference value and the flow angle of the rainwater is the second reference value or more; determining whether the flow speed of the rainwater is less than the first reference value by the controller when the discharge amount of the air blowing apparatus is set to the maximum; and coating a top surface of the windshield glass by the controller when the flow speed of the rainwater is less than the first reference value.

The method may further include: determining whether the flow speed of the rainwater measured by the rain sensor is less than a first reference value and whether the flow angle of the rainwater is less than a second reference value by the controller; determining whether the flow speed and flow angle of the rainwater is less than a third reference value by the controller when the flow speed of the rainwater is less than the first reference value and the flow angle of the rainwater is less than the second reference value; measuring external information of the vehicle when the flow speed and the flow angle of the rainwater is the third reference value by the controller; determining whether the windshield glass is in a dew point saturation state based on the measured external information by the controller; and operating a glass heater and a blow heater and controlling the spray angle and a discharge amount of the air blowing apparatus to a maximum by the controller when the windshield glass is in the dew point saturation state.

The method may further include, when a precipitation condition is not satisfied in determining of whether there is precipitation through the rain sensor by the controller; measuring a vehicle speed and a current opening angle of a cover of the air blowing apparatus, and calculating an ideal opening angle according to the vehicle speed; determining whether the vehicle speed exceeds a fourth vehicle speed; determining whether the opening angle of the cover of the air blowing apparatus is a predetermined angle or more; and operating a motor fastened to the cover such that the opening angle of the cover coincides with the predetermined angle.

According to the present disclosure, it is possible to achieve the following effects from the configuration, combination, and operation relationship described below.

The present disclosure has an effect of providing an improved visual field during driving because it is possible to control the pressure and angle of a discharged air in consideration of the driving environment condition for a user.

The present disclosure has an effect of providing a method of controlling an air blowing apparatus that discharges air in consideration of precipitation and a wind direction around a vehicle.

BRIEF DESCRIPTION OF THE DRAWINGS

The above and other objects, features, and other advantages of the present disclosure should be more clearly understood and apparent from the following detailed description when taken in conjunction with the accompanying drawings, in which.

DETAILED DESCRIPTION OF THE DISCLOSURE

Hereinafter, embodiments of the present disclosure are described in detail with reference to the accompanying drawings. Embodiments of the present disclosure may be modified in various ways and the scope of the present disclosure should not be construed as being limited to the embodiments described below. The embodiments are provided to more completely explain the present disclosure to those having ordinary skill in the art.

Terms "~er", "~unit", "~module", and the like used herein mean the units for processing at least one function or operation and may be implemented by hardware, software, or a combination of hardware and software.

The "opening amount" and "opening angle" stated herein are terms that mean the degree of opening of a nozzle cover 430 and include the same meaning.

The "left-right opening amount" and "left-right opening angle" stated herein are terms that mean the angle at which a nozzle blade 420 inclines in a width direction of a vehicle with respect to the longitudinal direction of the vehicle, and include the same meaning.

The "closed state" of the nozzle cover 430 stated herein means that the state in which an outlet of a nozzle housing 410 is covered with the nozzle cover 430.

A reference value stored in a controller may be set to increase with an increase of the number that the reference value represents.

Although the configuration in which the air blowing apparatus is disposed inside a cowl top cover assembly is described herein, the air blowing apparatus may be disposed in an area close to a windshield glass and may be disposed inside the hood of a vehicle or at the upper end of a roof of a vehicle. However, it is exemplified herein that the air blowing apparatus is disposed inside a cowl top cover assembly.

The present disclosure relates to an air blowing apparatus 100 configured to face a windshield glass 600. The air blowing apparatus 100 is disposed close to the windshield glass 600 and is able to remove dirt on the windshield glass 600 and to improve aerodynamic performance in accordance with the driving state of a vehicle.

Figure 1:
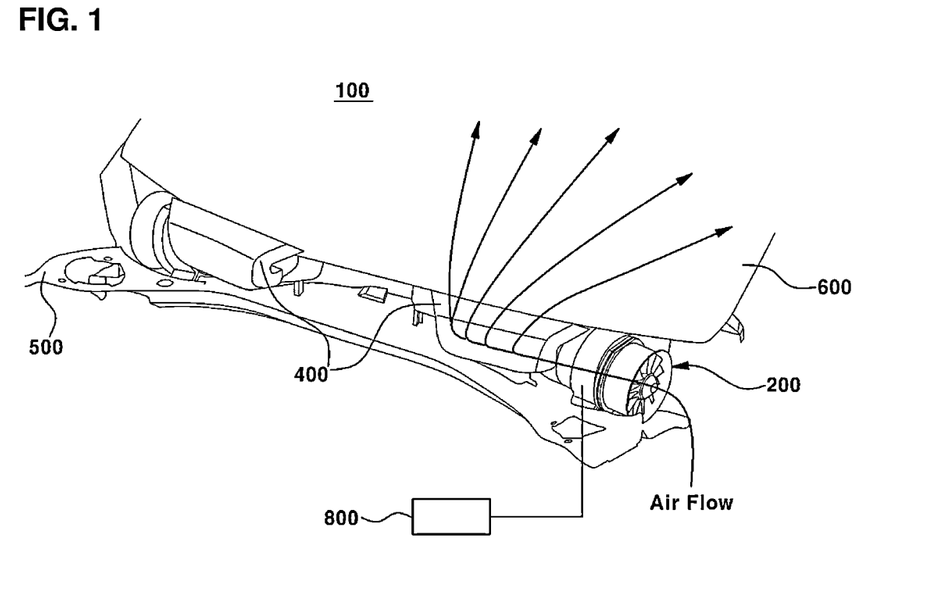
FIG. 1 is a perspective view of an air blowing apparatus mounted on a cowl top cover assembly as an embodiment of the present disclosure.

FIG. 1 is a perspective view of the air blowing apparatus 100 of the present disclosure. The air blowing apparatus 100 is disposed in a cowl top cover assembly 500 that is adjacent to the windshield glass 100. The air blowing apparatus 100 includes an outlet of nozzles 400 to face the windshield glass 600.

The air blowing apparatus 100 includes air nozzles 400 disposed at both ends of the cowl top cover assembly 500 and facing the windshield glass 600. The air blowing apparatus 100 is configured such that air flowing inside through sides is compressed by air fan assemblies 200 and is discharged along the windshield glass 600 through the air nozzles 400 along a duct 300 connecting fluid between the air nozzles 400 and the air fan assemblies 200.

The air fan assembly 200 includes a flow guide cover 240 that guides flow of the inflow air and blades 230 for compressing the air flowing inside along the fluid guide cover 240.

That is, the air fan assembly 200 includes a housing 210 with both open sides. The air flowing through the flow guide cover 240 is compressed through the blades 230 rotatably fastened to a motor assembly 220. The compressed air flows to the air nozzle 400 through an opening at an end fastened to the duct 300.

A controller 800 may include an electronic control unit (ECU) disposed in a vehicle and receives the amount of rainwater sensed and transmitted from a rain sensor. The controller 800 also receives the current driving speed of the vehicle measured by a vehicle sensor, an acceleration sensor, and the like.

The controller 800 can measure the flow speed and the flow angle of rainwater on the windshield glass through several sensing areas positioned at the rain sensor.

The controller 800 can control operation of the motor assembly 200 to control the torque of the blades 230 of the air fan assembly 200.

Accordingly, the controller 800 of the present disclosure can control the amount of air flowing into the air fan assembly 200 in correspondence to the driving environment of the vehicle. The controller 800 can also control the compression amount of the air flowing inside by controlling the power of the motor assembly 220.

Further, when a washer fluid spray pressure is applied in accordance with a request from a user, the controller 800 of the present disclosure can control the air fan assembly 200 such that the amount of compressed air is maximized in accordance with the washer fluid spray pressure. The compression amount of air, the amount of discharged air, or both of the compression amount of air and the amount of discharged air are controlled to be maximized.

Figure 2:
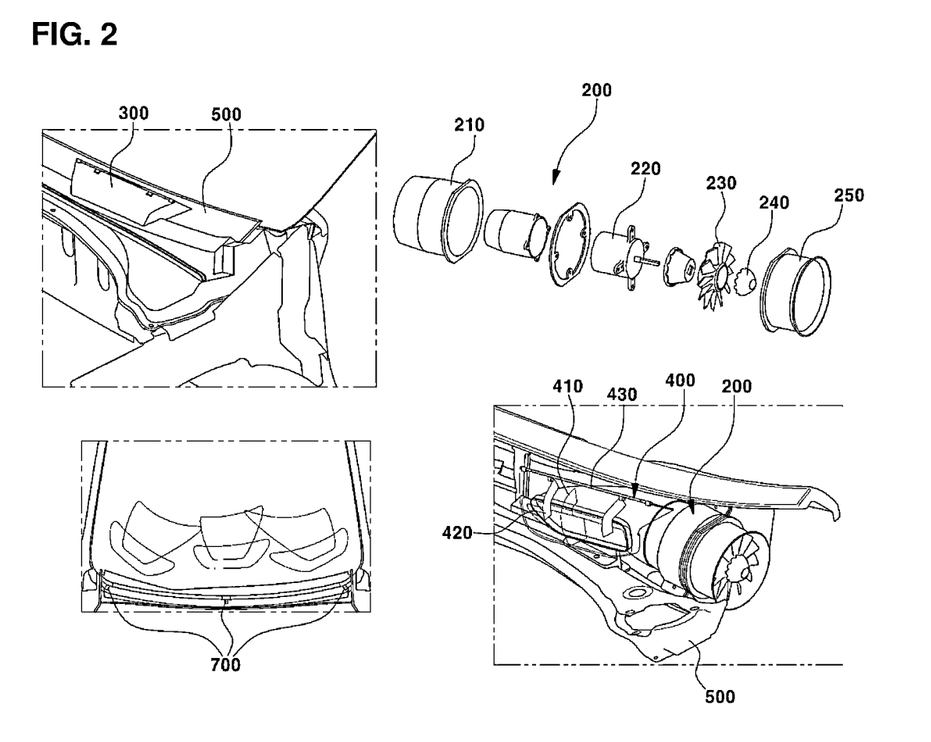
FIG. 2 is a view showing the configuration of the air blowing apparatus as an embodiment of the present disclosure.
Figure 3:
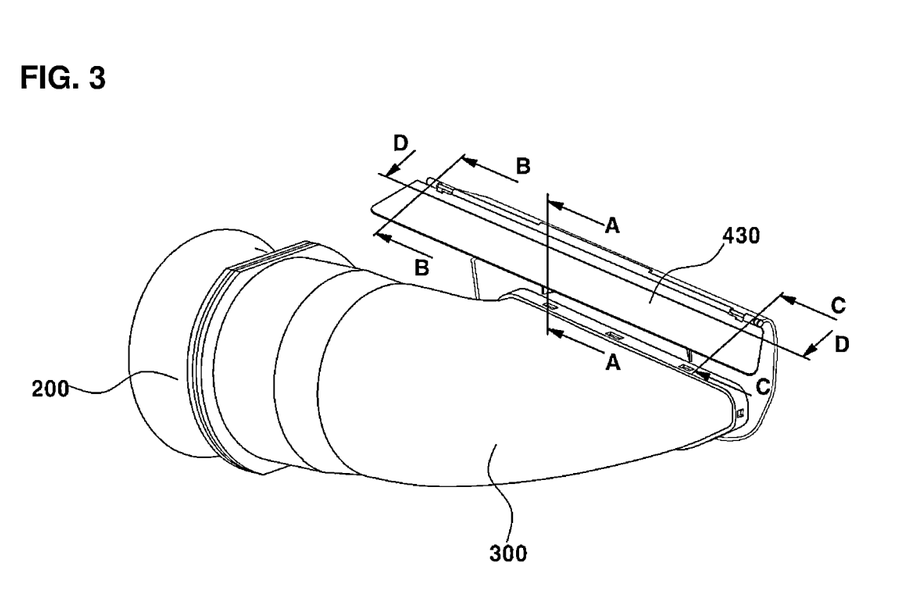
FIG. 3 is a perspective view showing a duct of the air blowing apparatus as an embodiment of the present disclosure.

The combination relationship of the components of the air blowing apparatus 100 is shown in FIGS. 2 and 3.

As shown in the figures, the air blowing apparatus 100 includes the air fan assembly 200 fixed to the cowl top cover assembly 500 and the duct 300 connecting fluid between the air fan assembly 200 and the air nozzle 400.

The air fan assembly 200 includes the housing 210 with both open sides and includes the fluid guide cover 240. The fluid guide cover 240 guides the flow of air flowing inside, on the inner side of the housing 210. The air fan assembly 200 also includes the blades 230 disposed adjacent to the fluid guide cover 240, the blades 230 receiving torque from the motor assembly 220.

The air fan assembly 200 suctions air through a side of a vehicle, so an open end of the housing 210 may be disposed adjacent to the side of the vehicle.

The housing 210 being adjacent to a side of a vehicle is fastened to a cover 250 such that the blades 230 are not exposed to the outside.

In an embodiment of the present disclosure, the air fan assembly 200 may be disposed in the width direction of the vehicle such that an open end of the housing 210 faces a side of the vehicle.

Air flowing inside through an opening of the housing 210 and flowing inside along the fluid guide cover 240 is compressed by torque of the blades 230 and then discharged through the other opening of the housing 210.

The compressed air discharged through the other opening of the housing 210 flows into one end of the duct 300. The other end of the duct 300 is fastened to an end of the nozzle housing 410 of the air nozzle 400.

The nozzle housing 410 of the present disclosure may be configured to have a nozzle for discharging compressed air in the same direction as the end fastened to the duct 300. The nozzle housing 410 has an opening fastened to the duct 300 at a lower end and a nozzle facing the windshield glass 600 at an upper end, such that the nozzle housing 410 is able to discharge compressed air at the upper end.

The rotational speed of the blades 230 is controlled by the controller 800. In an embodiment of the present disclosure, the operational amount of the motor assembly 220 and the rotational speed of the blades 230 rotated by the motor assembly 220 are controlled by the controller 800. The compression amount of inflow air is determined in accordance with the surrounding environment of the vehicle.

The nozzle means a space that is defined in the nozzle housing 410 to discharge compressed air toward the windshield glass 600, so it may be used as the same meaning as the air nozzle 410.

The nozzle housing 410 includes a nozzle cover 430 that is disposed between discharge spaces of the nozzle and includes a nozzle blade 420 being able to guide the left-right direction of air. The nozzle cover 430 opens when the pressure of compressed air is a predetermined pressure or more.

One or more nozzle blades 420 may be disposed in the nozzle housing 410. The left-right angle of the nozzle blades 420 may be set by an angle regulation boss 460 disposed on the rear surface of the nozzle cover 430.

According to an embodiment of the present disclosure, the discharge amount of the air blowing apparatus may be determined in accordance with the opening amount of the nozzle cover 430, in which the opening amount may be divided into three or more steps.

The nozzle blade 420 can set the spray angle of discharged air. The nozzle cover 430 and the nozzle blade 420 may be controlled by respective driving motors.

The cowl top cover assembly 500 disposed adjacent to the air nozzle 400 includes washer fluid nozzles 700. Washer fluid is sprayed along the windshield glass 600 together with the compressed air discharged through the air nozzles 400.

The washer fluid nozzles 700 may be disposed respectively between several air nozzles 400. According to an embodiment of the present disclosure, two air nozzles 400 and three washer fluid nozzles 700 may be provided.

The nozzle cover 430 is disposed at the opening of the housing 410 of the air nozzle 400 and hinged to the upper end of the housing 410 of the air nozzle 400 such that the nozzle cover 430 opens when the pressure of the discharged air is a predetermined pressure or more. The opening angle of the nozzle cover 430 increases in proportion to an increase of the pressure of the discharged air.

Figure 4:
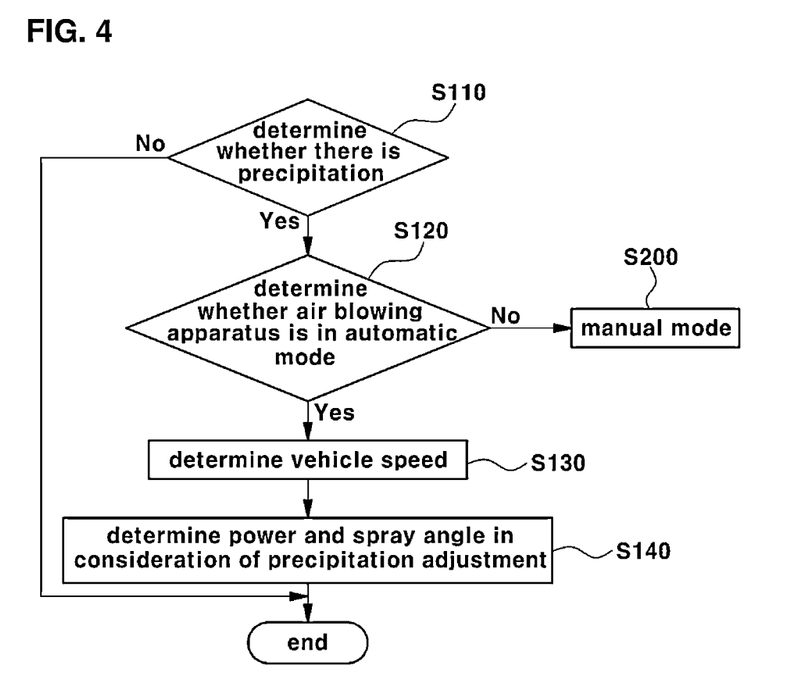
FIG. 4 is a flowchart showing a method of controlling an air blowing apparatus as an embodiment of the present disclosure.

FIG. 4 is a flowchart showing a method of controlling an air blowing apparatus as an embodiment of the present disclosure.

As shown in the figure, the method determines whether there is rainwater through a rain sensor disposed on the windshield glass of a vehicle (S110) and then determines whether the air blowing apparatus is automatically operated (S120).

When the air blowing apparatus is automatically operated by a request from a user, the method determines the speed of the vehicle (S130). When the air blowing apparatus is not automatically operated, the method determines that the air blowing apparatus is in a manual mode (S200).

When it is determined that the air blowing apparatus is automatically operated (S120), the method determines the speed of the vehicle (S130) and determines (i.e., sets) the power and the spray angle of the air blowing apparatus in consideration of the rainfall (S140).

The method compares the current speed of the vehicle (S130) with three predetermined reference values, in which the rainfall is divided into three sections for two reference values.

Further, the spray angle and the discharge amount of air to be output may be divided into three sections and set in the controller in accordance with the speed of the vehicle and a rainfall.

A flowchart that determines the spray angle of the air blowing apparatus and a discharge amount based on the speed of a vehicle and a rainfall is described hereafter.

Figure 5A:
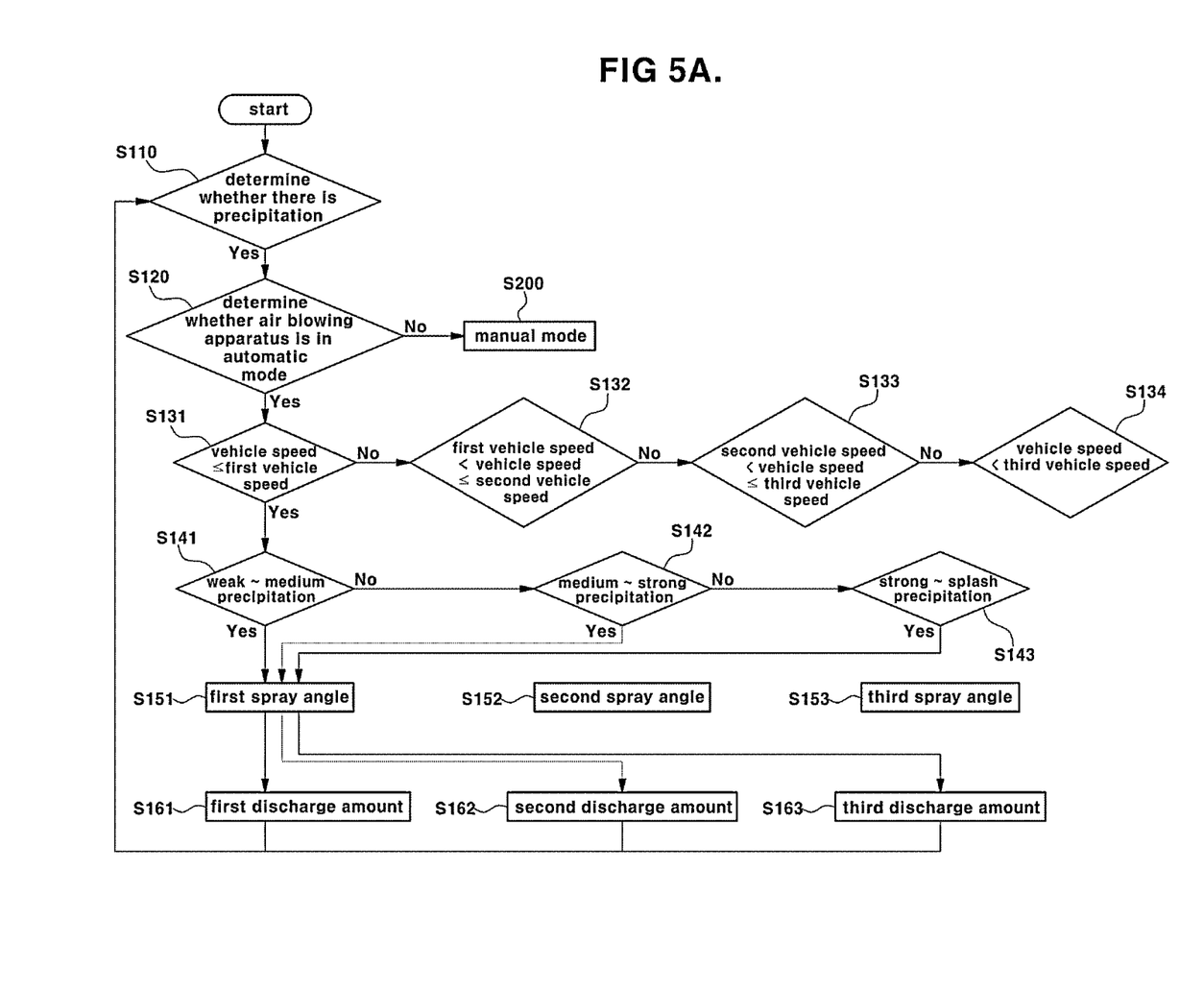
FIG. 5A is a flowchart showing a method of controlling an air blowing apparatus in a vehicle stop condition as an embodiment of the present disclosure.

FIG. 5A shows a process of controlling the air blowing apparatus in accordance with a rainfall when the vehicle speed is equal to or lower than a first vehicle speed (S131).

As shown in the figure, when the current vehicle speed is the first vehicle speed or less (S131) in the process of determining the speed of the vehicle (S130), and when the current rainfall is the first rainfall stored in the controller or less (S141), the method controls the spray angle of the air blowing apparatus to a first spray angle (S151) and controls the discharge amount to a first discharge amount (S161).

When the vehicle speed is the first vehicle speed or less, it may be determined as a stop condition of the vehicle. In this case, the discharge amount and the spray angle of the air blowing apparatus are controlled in accordance with a rainfall condition when the vehicle is stopped.

When the vehicle speed of the vehicle is the first vehicle speed or less (S131) and when the current rainfall exceeds the first rainfall and is a second rain fall stored in the controller or less (S142), the method controls the spray angle of the air blowing apparatus to the first spray angle (S151) and controls the discharge amount to a second discharge amount (S162).

When the vehicle speed of the vehicle is the first vehicle speed or less (S131) and when the current rainfall exceeds the second rainfall stored in the controller (S143), the method controls the spray angle of the air blowing apparatus to the first spray angle (S151) and controls the discharge amount to a third discharge amount (S163).

That is, when the vehicle is at a speed close to stoppage (the first vehicle speed or less), the air blowing apparatus forms the first spray angle to blow air intensively to the main visual field area of the windshield glass. As the rainfall increases, the discharge amount is proportionally increased.

Figure 5B:
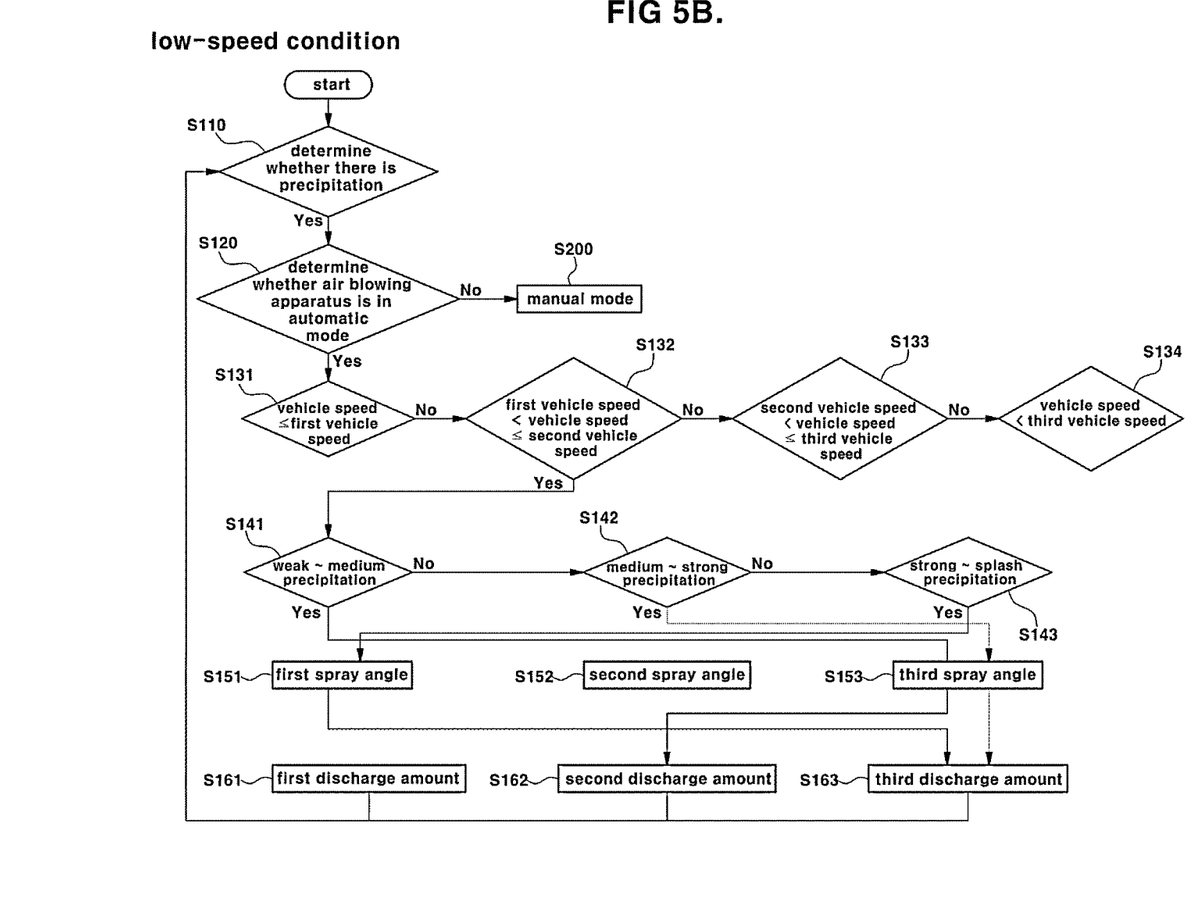
FIG. 5B is a flowchart showing a method of controlling an air blowing apparatus in a low-speed condition as an embodiment of the present disclosure.

FIG. 5B shows a flowchart of the method of controlling an air blowing apparatus in a low-speed condition (when the current vehicle speed exceeds the first vehicle speed and is the second vehicle speed or less).

As shown in the figure, when the current vehicle speed exceeds the first vehicle speed and is the second vehicle speed or less (S132) in the process of determining the speed of the vehicle (S130), and when the current rainfall is the first rainfall stored in the controller or less (S141), the method controls the spray angle of the air blowing apparatus to a third spray angle (S153) and controls the discharge amount to a second discharge amount (S162).

However, when the current vehicle speed exceeds the first vehicle speed and is the second vehicle speed or less (S132) in the process of determining the speed of the vehicle (S130), and when the current rainfall exceeds the first rainfall and is a second rainfall stored in the controller or less (S142), the method controls the spray angle of the air blowing apparatus to the third spray angle (S153) and controls the discharge amount to a third discharge amount (S163).

Further, when the current vehicle speed exceeds the first vehicle speed and is the second vehicle speed or less (S132) in the process of determining the speed of the vehicle (S130), and when the current rainfall exceeds the second rainfall stored in the controller (S142), the method controls the spray angle of the air blowing apparatus to the first spray angle (S151) and controls the discharge amount to the third discharge amount (S163).

As described above, in a low-speed condition, control is performed to provide a visual field of the windshield glass by providing a large discharge amount to as wide an area as possible.

However, as the rainfall increases, the spray angle is controlled to decrease. Controlling the air blowing apparatus in this way solves the problem of securing a visual field during a large amount of rainwater.

Figure 5C:
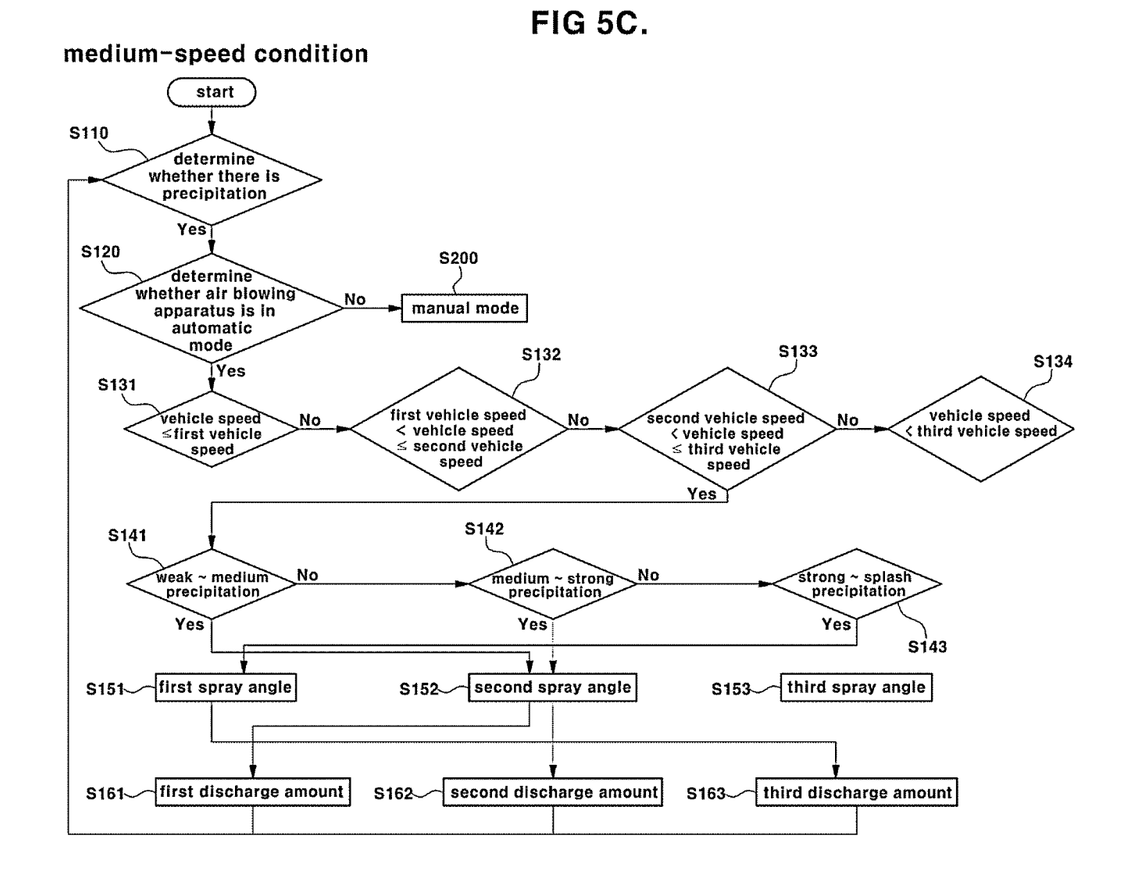
FIG. 5C is a flowchart showing a method of controlling an air blowing apparatus in a medium-speed condition as an embodiment of the present disclosure.

FIG. 5C shows a flowchart of the method of controlling an air blowing apparatus at a medium-speed condition (when the current vehicle speed exceeds the second vehicle speed and is the third vehicle speed or less).

As shown in the figure, when the current vehicle speed exceeds the second vehicle speed and is the third vehicle speed or less (S133) in the process of determining the speed of the vehicle (S130), and when the current rainfall is the first rainfall stored in the controller or less (S141), the method controls the spray angle of the air blowing apparatus to the second spray angle (S152) and controls the discharge amount to the first discharge amount (S161).

However, when the current vehicle speed exceeds the second vehicle speed and is the third vehicle speed or less (S133) in the process of determining the speed of the vehicle (S130), and when the current rainfall exceeds the first rainfall and is a second rainfall stored in the controller or less (S142), the method controls the spray angle of the air blowing apparatus to the second spray angle (S152) and controls the discharge amount to the second discharge amount (S162).

Further, when the current vehicle speed exceeds the second vehicle speed and is the third vehicle speed or less (S133) in the process of determining the speed of the vehicle (S130), and when the current rainfall exceeds the second rainfall stored in the controller (S143), the method controls the spray angle of the air blowing apparatus to the first spray angle (S151) and controls the discharge amount to the third discharge amount (S163).

Figure 5D:
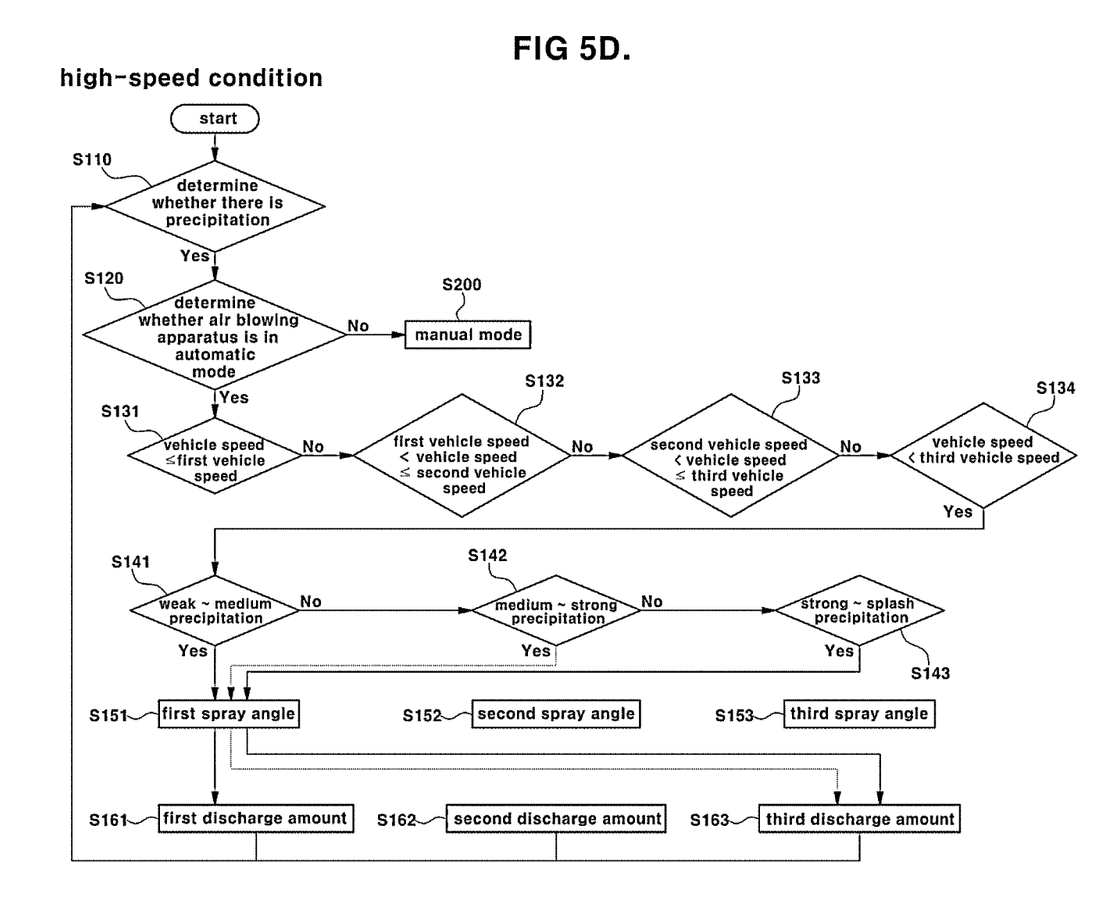
FIG. 5D is a flowchart showing a method of controlling an air blowing apparatus in a high-speed condition as an embodiment of the present disclosure.

FIG. 5D shows a flowchart of the method of controlling an air blowing apparatus at a high-speed condition (when the current vehicle speed exceeds the third vehicle speed).

As shown in the figure, when the current vehicle speed exceeds the third vehicle speed (S134) in the process of determining the speed of the vehicle (S130), and when the current rainfall is the first rainfall stored in the controller or less (S141), the method controls the spray angle of the air blowing apparatus to the first spray angle (S151) and controls the discharge amount to the first discharge amount (S161).

However, when the current vehicle speed exceeds the third vehicle speed (S134) in the process of determining the speed of the vehicle (S130), and when the current rainfall exceeds the first rainfall and is a second rainfall stored in the controller or less (S142), the method controls the spray angle of the air blowing apparatus to the first spray angle (S151) and controls the discharge amount to the third discharge amount (S163).

Further, when the current vehicle speed exceeds the third vehicle speed (S134) in the process of determining the speed of the vehicle (S130), and when the current rainfall exceeds the second rainfall stored in the controller (S143), the method controls the spray angle of the air blowing apparatus to the first spray angle (S151) and controls the discharge amount to the third discharge amount (S163).

As described above, the air blowing apparatus is controlled to have the first spray angle and the first discharge amount in a weak precipitation condition with a small amount of rainfall (the current rainfall is the first rainfall or less) in a high-speed condition. The air blowing apparatus is controlled to have the first spray angle and the third discharge amount in the medium precipitation condition (the current rainfall exceeds the first rainfall and is the second rainfall or less) and a heavy rain condition (the current condition exceeds the second rainfall).

That is, the spray angle and the discharge amount is controlled in a high-speed condition in which the vehicle speed exceeds the third vehicle speed such that the discharge amount is maximized and instantaneous block of the visual field is prevented at a predetermined rainfall or more.

Further, the rain sensor measures the flow angle and the flow speed of the rainwater flowing on the windshield glass. The spray angle is compensated in consideration of the flow angle and the flow speed of rainwater when it is set in FIGS. 5A-5D.

As described with reference to FIGS. 5A-5D, the spray angle and the discharge amount of the air blowing apparatus are controlled based on the vehicle speed divided into four parts and the precipitation condition divided into three parts.

Hereafter, a method of controlling the discharge amount of the air blowing apparatus in accordance with the flow speed and the flow angle of water according to an external wind amount is described with reference to FIG. 6.

Figure 6:
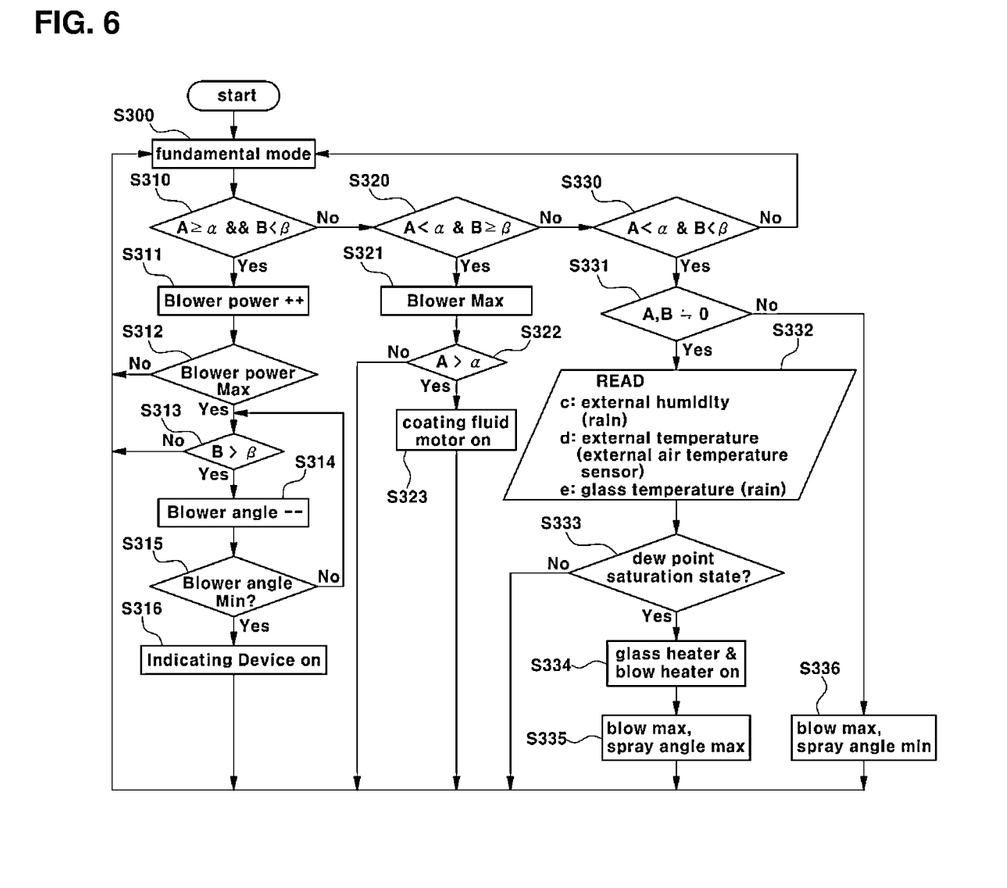
FIG. 6 is a view showing a method of controlling a discharge amount of an air blowing apparatus in accordance with a flow speed and a flow angle of water according to an external wind amount as an embodiment of the present disclosure.

FIG. 6 shows a method of measuring the flow speed and the flow angle of rainwater on a windshield glass and controlling the corresponding discharge amount of the air blowing apparatus.

As described above, the flow angle and speed of rainwater on the windshield glass depends on the external wind amount. The rain sensor has one or more sensing areas and can measure the speed of rainwater by measuring the time that the rainwater takes to pass the sensing areas.

The controller sets the power and the spray angle of the air blowing apparatus by comparing the rainfall received from the rain sensor with stored values. In other words, the controller measures the flow speed and flow angle of rainwater on the windshield glass through the rain sensor when it is determined that the air blowing apparatus is in a precipitation condition in an automatic mode.

Thereafter, the controller controls the power of the air blowing apparatus in accordance with the measured flow speed and flow angle of the rainwater. The controller compares a first reference value stored therein with the flow speed of the rainwater and compares a second reference value stored therein with the flow angle of the rainwater.

The first reference value is a flow speed at which it is impossible to remove rainwater by blowing air and the second reference value is a critical flow angle of water that interferes with a visual field.

The controller determines whether the discharge amount of the air blowing apparatus is maximum when the flow speed of rainwater is the first reference value or more and the flow angle of rainwater is less than the second reference value (S310).

The first reference value and the second reference value are respectively a speed reference value (first reference value) and an angle reference value (second reference value) of rainwater flowing on the windshield glass that are determined in consideration of the operation of the air blowing apparatus in an external wind condition. The first reference value and the second reference value are set in the controller.

The second reference value is the flow angle of water that interferes with the visual field of a user. When a measured value is less than the second reference value, it means there is no problem with the visual field of the user due to the flow angle of rainwater.

In an embodiment of the present disclosure, the controller can determine a value less than the second reference value when the flow angle of rainwater has a small angle in the width direction of the windshield glass.

The controller determines that the flow angle of rainwater exceeds the second reference value when the discharge amount of the air blowing apparatus is maximum (S313). When the flow angle of rainwater exceeds the second reference value, the controller decreases the spray angle of the air blowing apparatus (S314) and determines whether the spray angle is minimum (S315).

When the spray angle of the air blowing apparatus is minimum (S315) in the condition described above (S313), the controller informs a user that the visual field cannot be improved through additional control through an alarm (S316).

When the discharge amount of the air blowing apparatus is not maximum (S312) or when the flow angle of rainwater is the second reference value or less (S313), the method returns to the initial step.

As described above, when the flow speed of rainwater is higher than the first reference value, there is flow of rainwater, and when the flow angle of the rainwater is less than the second reference value, the problem of blocking the visual field of a user is generated. In this case, the controller controls the discharge amount of the air blowing apparatus to the maximum and the spray angle to the minimum.

Alternatively, the controller controls the discharge amount of the air blowing apparatus to the maximum (S321) when the flow speed of rainwater is less than the first reference value and when the flow angle of rainwater is the second reference value or more (S320).

Thereafter, the controller determines whether the flow speed of the rainwater exceeds the first reference value (S322). When the flow speed of the rainwater exceeds the first reference value, the controller operates a coating fluid operator so that coating fluid is sprayed to the top surface of the windshield glass (S323).

However, when the flow speed of the rainwater is the first reference value or less (S322), the method returns to the first step.

When the flow speed of rainwater less than the first reference value, it means the speed of the rainwater is not applied in accordance with a blowing discharge amount. In this case, the top surface of the windshield glass is coated, thereby preventing rainwater from remaining on the windshield glass.

Further, the controller determines whether the flow speed and the flow angle of rainwater are a third reference value (S331) when the flow speed of rainwater is less than the first reference value and the flow angle of the rainwater is less than the second reference value (S330).

In an embodiment of the present disclosure, the third value is substantially close to 0, which means that rainwater remains on the windshield glass.

When the flow speed and the flow angle of rainwater are the third reference value (S331), information outside the vehicle is measured (S332). In other words, in an embodiment of the present disclosure, the controller measures external humidity, external temperature, and glass temperature information as the information outside the vehicle.

However, when the flow speed and the flow angle of rainwater are not the third reference value (S331), the discharge amount of the air blowing apparatus is controlled to the maximum and the spray angle is controlled to the minimum (S336).

That is, when the flow speed and the flow angle of rainwater are not the third reference value and when there is flow of rainwater and an angle is measured by the flow, the air blowing apparatus is controlled to operate to provide a visual field to a user.

The controller determines whether it is in a dew point saturation state of the windshield glass through the measured external information (S333). When it is the dew point saturation state of the windshield glass, the controller operates a glass heater and a blow heater (S334) and controls the spray angle and the discharge amount of the air blowing apparatus to the maximum (S335).

As described above, it is possible to determine whether condensation occurs in accordance with the flow speed and flow angle of rainwater on the windshield glass. The controller controls the glass heater, the blower heater, and the air blowing apparatus to provide an instantaneous visual field and a consistent visual field through the windshield glass with condensate water thereon.

Figure 7:
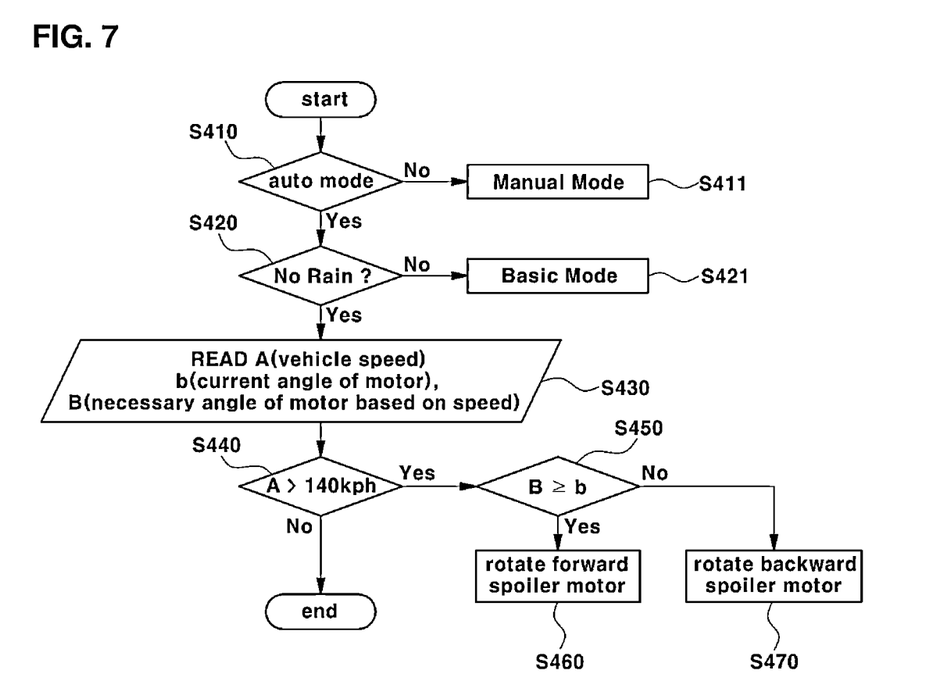
FIG. 7 is a view showing a method of controlling the opening amount of a nozzle cover according to a vehicle speed as an embodiment of the present disclosure.

FIG. 7 shows a control method that performs a spoiler function by adjusting the angle of the nozzle cover 430 in correspondence to a vehicle speed as an embodiment of the present disclosure.

As shown in the figure, when precipitation is not measured (S420) in the automatic mode (S410), the controller measures the current position of a motor for opening the cover and calculates the opening angle of the cover of the air blowing apparatus in correspondence to the current vehicle speed (S430).

Thereafter, whether the vehicle speed exceeds a fourth vehicle speed is determined (S440). When the vehicle speed exceeds the fourth vehicle speed, the controller determines whether the opening angle of the cover of the air blowing apparatus is a predetermined angle or more (S450).

In an embodiment of the present disclosure, the fourth vehicle speed may be set as 140 km/h.

When the opening angle calculated based on the vehicle speed is the current opening angle or more of the cover of the air blowing apparatus, the controller rotates forward the motor fastened to the cover such that the opening angle of the cover coincides with the predetermined angle (S460).

Further, when the opening angle calculated based on the vehicle speed is less than the current opening angle of the cover of the air blowing apparatus, the controller rotates backward the motor fastened to the cover such that the opening angle of the cover coincides with the predetermined angle (S470).

Accordingly, the calculated opening angle of the nozzle cover 430 that performs a spoiler function and the current opening angle are compared, whereby the nozzle cover 430 is controlled to the calculated opening angle by the motor fastened to the nozzle cover 430.

However, when the air blowing apparatus is not in the automatic mode, the mode is changed to the manual mode (S411). When there is precipitation, a fundamental precipitation mode is turned on and the spray angle and the discharge amount of the air blowing apparatus are controlled (S421).

As described above, the present disclosure provides a method of controlling an air blowing apparatus including a nozzle cover that provides a visual field through a windshield glass and performs a spoiler function.

The specification provides examples and embodiments of the present disclosure. Further, the present disclosure may be used in other various combinations, changes, and environments. That is, the present disclosure may be changed or modified within the scope of the present disclosure described herein, a range equivalent to the description, and/or within the knowledge or technology in the related art. The embodiments show an optimum state for achieving the spirit of the present disclosure and may be changed in various ways for the detailed application fields and use of the present disclosure. Therefore, the detailed description is not intended to limit the present disclosure to the embodiments disclosed. Further, the claims should be construed as including other embodiments.

What is claimed is:

1. A method of controlling an air blowing apparatus, the method comprising:
   determining whether there is precipitation through a rain sensor by a controller;
   determining whether the air blowing apparatus is in an automatic mode in a precipitation condition by the controller;
   determining a vehicle speed when the air blowing apparatus is in the automatic mode in the precipitation condition; and
   setting power and a spray angle of the air blowing apparatus by comparing a measured rainfall received from the rain sensor to a stored rainfall by the controller,
   wherein setting the power and the spray angle of the air blowing apparatus includes compensating the spray angle and a spray amount of the air blowing apparatus by measuring a flow speed and a flow angle of rainwater through the rain sensor by the controller.

2. The method of claim 1, wherein, in determining the vehicle speed, the method further comprises:
   comparing a vehicle speed received from the controller with a first vehicle speed;
   determining a stop condition of the vehicle when the vehicle speed is the first vehicle speed or less, and comparing the vehicle speed with a second vehicle speed when the vehicle speed exceeds the first vehicle speed;
   determining a low-speed state of the vehicle when the vehicle speed is the second vehicle speed or less, and comparing the vehicle speed with a third vehicle speed when the vehicle speed exceeds the second vehicle speed; and
   determining that the vehicle is in a medium-speed state when the vehicle speed is the third vehicle speed or less, and determining that the vehicle is in a high-speed state when the vehicle speed exceeds the third vehicle speed.

3. The method of claim 2, wherein, when the state of the vehicle is determined in determining the vehicle speed, the controller compares the measured rainfall received from the rain sensor to the stored rainfall, and wherein the method further comprises:
   comparing the measured rainfall with a first rainfall stored in the controller;
   determining a weak precipitation condition when the measured rainfall is the first rainfall or less, and comparing the measured rainfall with a second rainfall stored in the controller when the measured rainfall exceeds the first rainfall; and
   determining a medium precipitation condition when the measured rainfall is the second rainfall or less, and determining a heavy rain condition when the measured rainfall exceeds the second rainfall.

4. The method of claim 3, further comprising:
   controlling the air blowing apparatus to have a first spray angle and a first discharge amount when the measured rainfall is the first rainfall or less in a stop condition of the vehicle.

5. The method of claim 3, further comprising:
   controlling the air blowing apparatus to have a first spray angle and a second discharge amount when the measured rainfall exceeds the first rainfall and is the second rainfall or less in a stop condition of the vehicle.

6. The method of claim 3, further comprising:
   controlling the air blowing apparatus to have a first spray angle and a third discharge amount when the measured rainfall exceeds the second rainfall in a stop condition of the vehicle.

7. The method of claim 3, further comprising:
   controlling the air blowing apparatus to have a third spray angle and a second discharge amount when the measured rainfall is the first rainfall or less in a low-speed condition of the vehicle.

8. The method of claim 3, further comprising:
   controlling the air blowing apparatus to have a third spray angle and a third discharge amount when the measured rainfall exceeds the first rainfall and is the second rainfall or less in a low-speed condition of the vehicle.

9. The method of claim 3, further comprising:
   controlling the air blowing apparatus to have a first spray angle and a third discharge amount when the measured rainfall exceeds the second rainfall in a low-speed condition of the vehicle.

10. The method of claim 3, further comprising:
    controlling the air blowing apparatus to have a second spray angle and a first discharge amount when the measured rainfall is the first rainfall or less in a medium-speed condition of the vehicle.

11. The method of claim 3, further comprising:
    controlling the air blowing apparatus to have a second spray angle and a second discharge amount when the measured rainfall exceeds the first rainfall and is the second rainfall or less in a medium-speed condition of the vehicle.

12. The method of claim 3, further comprising:
    controlling the air blowing apparatus to have a first spray angle and a third discharge amount when the measured rainfall exceeds the second rainfall in a medium-speed condition of the vehicle.

13. The method of claim 3, further comprising:
    controlling the air blowing apparatus to have a first spray angle and a first discharge amount when the measured rainfall is the first rainfall or less in a high-speed condition of the vehicle.

14. The method of claim 3, further comprising:
controlling the air blowing apparatus to have a first spray angle and a third discharge amount when the measured rainfall exceeds the first rainfall and is the second rainfall or less in a high-speed condition of the vehicle.

15. The method of claim 3, further comprising:
controlling the air blowing apparatus to have a first spray angle and a third discharge amount when the measured rainfall exceeds the second rainfall in a high-speed condition of the vehicle.

16. The method of claim 1, wherein setting the power and the spray angle of the air blowing apparatus further comprises:
measuring the flow speed and the flow angle of rainwater on a windshield glass through the rain sensor; and
controlling the power of the air blowing apparatus in accordance with the measured flow speed and flow angle of the rainwater.

17. The method of claim 1, further comprising:
measuring whether the flow speed of the rainwater measured by the rain sensor is a first reference value or more and measuring whether the flow angle is less than a second reference value by the controller;
determining whether a discharge amount of the air blowing apparatus is a maximum amount by the controller when the flow speed of the rainwater is the first reference value or more and the flow angle of the rainwater is less than the second reference value;
determining whether the flow angle of the rainwater exceeds the second reference value by the controller when the discharge amount of the air blowing apparatus is the maximum amount;
determining whether a spray angle of the rainwater is a minimum angle by the controller when the discharge amount of the air blowing apparatus is the maximum amount and the flow angle of the rainwater is the second reference value or less; and
providing notification to a user by the controller when the spray angle of the rainwater is the minimum angle.

18. The method of claim 16, further comprising:
determining whether the flow speed of the rainwater measured by the rain sensor is less than a first reference value and whether the flow angle of the rainwater is a second reference value or more by the controller;
setting a discharge amount of the air blowing apparatus to a maximum by the controller when the flow speed of the rainwater is less than the first reference value and the flow angle of the rainwater is the second reference value or more;
determining whether the flow speed of the rainwater is less than the first reference value by the controller when the discharge amount of the air blowing apparatus is set to the maximum; and
coating a top surface of the windshield glass by the controller when the flow speed of the rainwater is less than the first reference value.

19. The method of claim 16, further comprising:
determining whether the flow speed of the rainwater measured by the rain sensor is less than a first reference value and whether the flow angle of the rain water is less than a second reference value by the controller;
determining whether the flow speed and flow angle of the rainwater is less than a third reference value by the controller when the flow speed of the rainwater is less than the first reference value and the flow angle of the rainwater is less than the second reference value;
measuring external information of the vehicle when the flow speed and the flow angle of the rainwater are the third reference value by the controller;
determining whether the windshield glass is in a dew point saturation state base on the measured external information by the controller; and
operating a glass heater and a blow heater and controlling the spray angle and a discharge amount of the air blowing apparatus to a maximum by the controller when the windshield glass is in the dew point saturation state.

20. The method of claim 1, wherein, when a precipitation condition is not satisfied in determining whether there is precipitation through the rain sensor by the controller, the method further comprises:
measuring the vehicle speed and a current opening angle of a cover of the air blowing apparatus, and calculating an ideal opening angle according to the vehicle speed;
determining whether the vehicle speed exceeds a fourth vehicle speed;
determining whether the opening angle of the cover of the air blowing apparatus is a predetermined angle or more; and
operating a motor fastened to the cover such that the opening angle of the cover coincides with the predetermined angle.

* * * * *